C. A. HOFFMAN.
RIMLESS SPECTACLE MOUNTING.
APPLICATION FILED APR. 9, 1906.
1,129,490.
Patented Feb. 23, 1915.
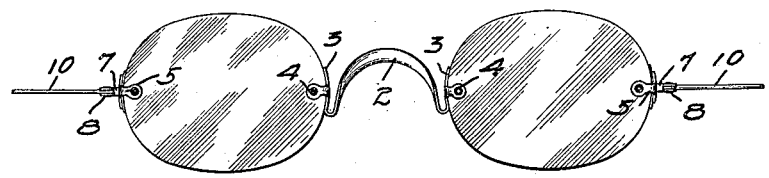
FIG. 1.
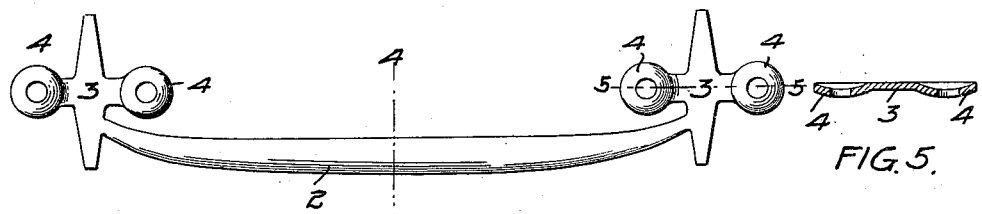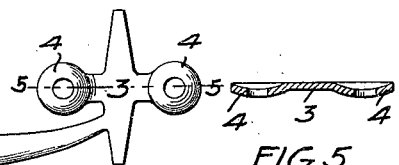
FIG. 2.  FIG. 5.
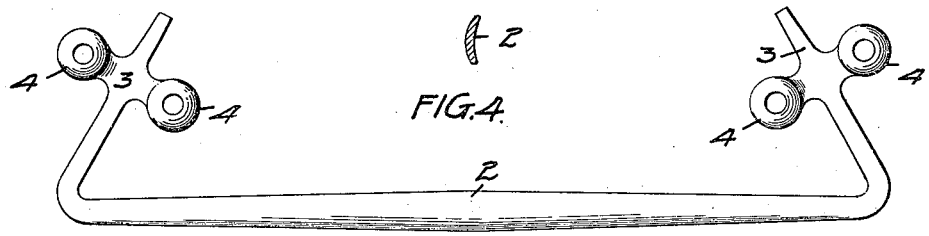
FIG. 4.
FIG. 3.
WITNESSES
INVENTOR
CHARLES A. HOFFMAN
By Paul & Paul
HIS ATTORNEYS

UNITED STATES PATENT OFFICE.

CHARLES A. HOFFMAN, OF MINNEAPOLIS, MINNESOTA.

RIMLESS-SPECTACLE MOUNTING.

1,129,490. Specification of Letters Patent. Patented Feb. 23, 1915.

Application filed April 9, 1906. Serial No. 310,606.

*To all whom it may concern:*

Be it known that I, CHARLES A. HOFFMAN, of Minneapolis, county of Hennepin, State of Minnesota, have invented certain new and useful Improvements in Rimless-Spectacle Mountings, of which the following is a specification.

This invention relates to improvements in spectacle mountings, and the objects I have in view are to provide a mounting of this kind in which each of the parts is stamped from a single piece of sheet metal, thereby avoiding heating and brazing of the metal and thus retaining the elasticity and springiness of the parts; also avoiding the labor of brazing and the separation of the molecules of the metal by heating, which tends to weaken the same.

The invention consists generally in the constructions and combinations hereinafter described and particularly pointed out in the claims.

In the accompanying drawings, forming part of this specification, Figure 1 is a rear elevation of a pair of spectacles embodying my invention. Fig. 2 is a plan view of the nose-piece or bridge with the straps that straddle the lenses. Fig. 3 is a view similar to Fig. 2 showing a slightly modified construction. Fig. 4 is a section on line 4—4 of Fig. 2. Fig. 5 is a section on line 5—5 of Fig. 2.

In the drawings 2 represents a bridge or nose-piece which is stamped from a single piece of sheet metal and has formed integrally with it, the braces 3, 3, for the edge of the lenses and the straps or lens-clamps 4, 4, formed integrally with said braces. The ends of the lens-clamps are concave or made cup-shaped on the inner surfaces, so that the margins only rest on the glass and thus avoid breaking the lenses, to a very great extent. The bridge-piece is bent into suitable form to rest on the bridge of the nose, with its end projecting from the braces 3, 3, and with the straps or lens-clamps 4, 4 bent into position to grasp the lens (see Fig. 1). At the outer end of each lens, I provide a lens-clamp 5 also formed of a single piece of metal having the cup shaped ends and formed with a brace plate 7 having ears 8 between which is pivoted the temple-piece 10.

I may use the bridge-piece as shown in Fig. 2 with its ends joining the sides of the braces 3, 3 or in the form shown in Fig. 3, in which one end of each brace 3 merges into the end of the nose-piece or bridge.

The nose-piece differs from an eye-glass mounting in that it is substantially rigid and inflexible and is preferably concaved on its upper surface to give it strength and stability, while the lens-clamps are concaved on their inner surfaces so as to bear only at their margins on the surface of the glass, and the nose-piece or bridge, the braces and lens-clamps for the inner ends of the lenses are all stamped out from a single piece of metal. The entire mounting, it will be seen, is formed from stamped metal, without the use of brazing or heating, and without the use of screws or rivets, the clamps being secured in place by the telescoping eyelets.

Many advantages will result from the structure of the mounting herein shown and described. As the metal is not brazed or heated it retains its elasticity and is not weakened by heating.

I claim as my invention:

1. A rimless spectacle mounting consisting of an inflexible bridge-portion having at its ends brace-pieces extending rearwardly from the bridge-portion and the bridge-portion at the junction with said braces bent to bring the braces in position to bear against the edges of the lenses and cause the bridge to project in a plane forward of and at an angle to the plane of the lenses, the brace-pieces being provided with oppositely disposed clamps both of which project therefrom parallel with each other and bear against opposite sides of the lenses, substantially as described.

2. A rimless spectacle mounting consisting of a relatively thin bridge having its middle portion formed with a concave upper surface and having at its ends brace-pieces extending rearwardly from the bridge and the bridge at the junction with said braces bent to bring the braces in position to bear against the edges of the lenses and cause the bridge to project in a plane forward of and at an angle to the plane of the lenses, the brace-pieces being provided with oppositely disposed clamps both of which project therefrom parallel with each other and bear against opposite sides of the lenses, substantially as described.

In witness whereof, I have hereunto set my hand this 4th day of April 1906.

CHARLES A. HOFFMAN.

Witnesses:
A. C. PAUL,
C. G. HANSON.